(12) United States Patent
Legret et al.

(10) Patent No.: US 7,040,093 B2
(45) Date of Patent: May 9, 2006

(54) PENETRATION MASTER CYLINDER WITH REDUCED BACKLASH AND APPLICATION THEREOF

(75) Inventors: Pierre Legret, Versailles (FR); Philippe Bourlon, Dammartin en Goele (FR)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 10/484,327

(22) PCT Filed: Jul. 11, 2002

(86) PCT No.: PCT/FR02/02444

§ 371 (c)(1), (2), (4) Date: Nov. 1, 2004

(87) PCT Pub. No.: WO03/006284

PCT Pub. Date: Jan. 23, 2003

(65) Prior Publication Data

US 2005/0172626 A1    Aug. 11, 2005

(30) Foreign Application Priority Data

Jul. 13, 2001    (FR) ................................. 01 09449

(51) Int. Cl.
*B60T 11/228*    (2006.01)

(52) U.S. Cl. .......................................... 60/588; 60/586

(58) Field of Classification Search .................. 60/585, 60/586, 588
See application file for complete search history.

(56) References Cited

U.S. PATENT DOCUMENTS 4,934,250 A * 6/1990 Siegel .......................... 60/552
6,550,246 B1 * 4/2003 Barr et al. .................... 60/588

FOREIGN PATENT DOCUMENTS

EP    918005 A2 * 5/1999

* cited by examiner

*Primary Examiner*—Thomas E. Lazo
(74) *Attorney, Agent, or Firm*—Lee H McCormick, Jr.; Warren Comstock; Sarah Taylor

(57) ABSTRACT

This invention relates to a master cylinder of the so-called "penetration" type, in which a cup (3), which is fitted inside a groove (11) of the master cylinder, bears on the wall (20) of a piston (2) in a sealing manner, and in which such wall (20) is provided with main resupply ports (51).

According to the invention, the wall (20) of the piston (2) also comprises secondary resupply ports (52) having a smaller size than that of the main resupply ports (51) and disposed farther from the bottom part (33) of the cup (3), and achieving an outstanding static resupply of the master cylinder with brake fluid, with a reduced dynamic dead stroke.

7 Claims, 2 Drawing Sheets

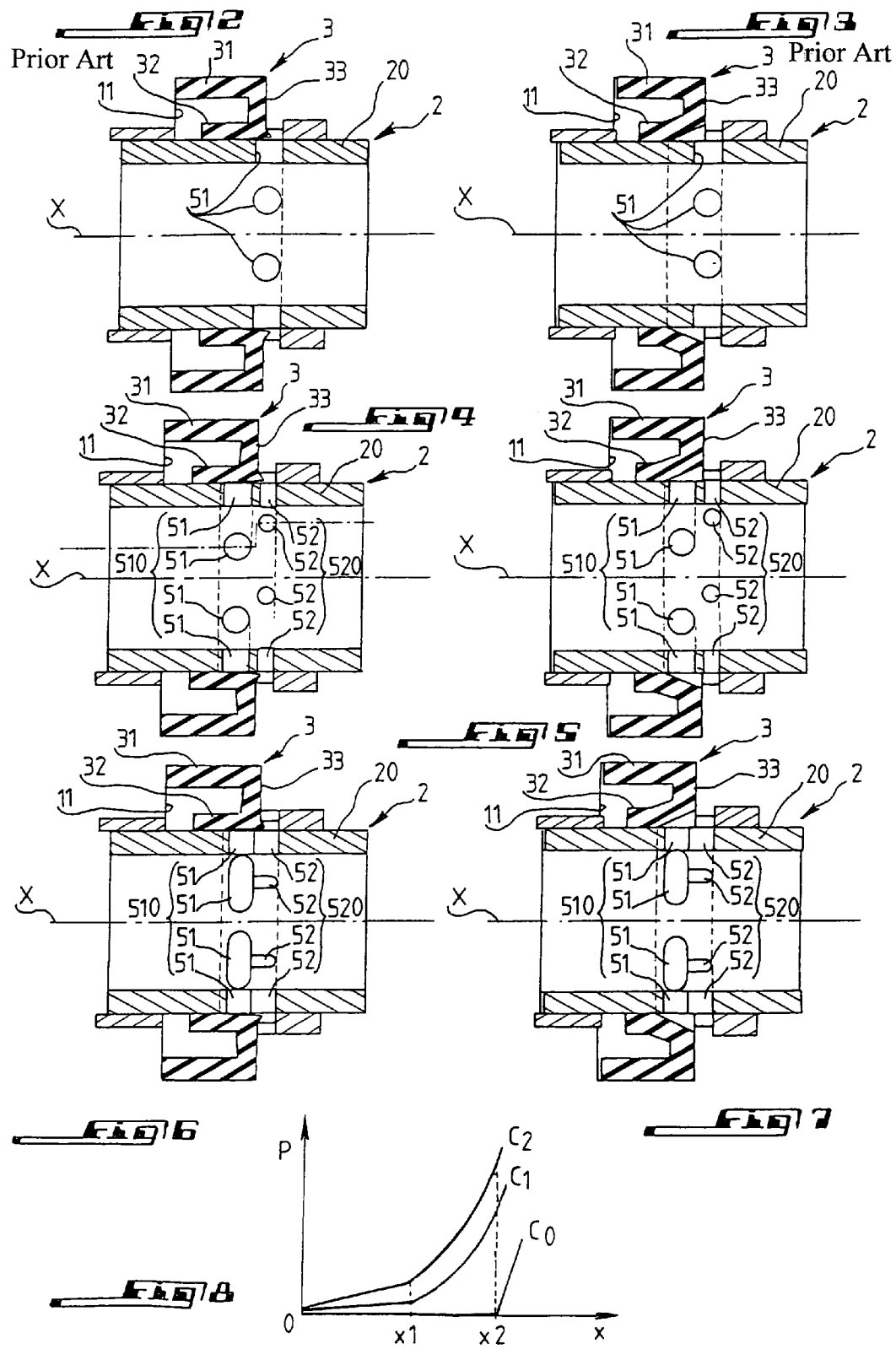

PENETRATION MASTER CYLINDER WITH REDUCED BACKLASH AND APPLICATION THEREOF

This invention relates generally to a constituent part for a hydraulic braking system intended for a motor vehicle.

More particularly, the present invention deals with a penetration master cylinder, of the type comprising at least a body in which a cylindrical bore is provided along an axis of symmetry, a piston fitted for a sliding axial travel inside the bore, at least between a rest position and a pressure-rise position, and a sealing cup having a long bent portion, stationarily housed inside a groove provided in the bore, a lip applied against a cylindrical wall of the piston, in a sealing manner, so as to define a pressure chamber inside the bore, and a bottom portion joining the long bent portion to the lip, wherein the cylindrical wall of the piston provides a cavity, intended for the pressure chamber, and exhibits at least a first resupply port having a determined first cross-sectional area and disposed adjacent to the bottom portion of the cup in the rest position of the piston, a position in which such first port causes the pressure chamber to communicate with a resupply passage, which is located inside the body and outside the chamber.

Such devices are well known from the state of the art and they have been used for many years quite satisfactorily.

For all that, the development of hydraulic braking circuits, which are nowadays, more often than not, equipped with wheel antiblocking systems (ABS) and/or with dynamic control systems for the car frame, which use independently-controlled hydraulic pumps, results in that new constraints are imposed on the design of master cylinders and, in particular, of the penetration master cylinders.

More specifically, when a pump, integrated into a hydraulic braking circuit, is actuated, when the master cylinder is actuated, the volume of brake liquid in the high pressure brake circuit, that shall be brought back to the low pressure tank through the master cylinder, may be so big that the pistons of the master cylinder may be pushed back to their rest position without decreasing of the brake liquid pressure in the master cylinder to a pressure close to atmospheric pressure.

In this case, the sealing cups of the master cylinder can be deformed till they cover communication ports with the low pressure reservoir, the master cylinder being still under high pressure.

To avoid this phenomenon, each communication port with the reservoir has to be shifted relative to the corresponding pressure chamber.

Now, said measure is a nuisance in itself, in that it means a greater dead stroke of the master cylinders, which are redimensioned in such a way.

In this background, the object of the present invention is to provide a penetration master cylinder having both a reduced dead stroke and a high resupply speed for each pressure chamber.

To this end, the master cylinder according to the invention, which is consistent with the generic definition as per the introductory part hereinabove, is mainly characterised in that it comprises at least a second port having a smaller cross-sectional area than that of the first port, and in that the first and second ports are comparatively nearer and farther from the lip of the cup, respectively, in the rest position of the piston, in which the second port causes the pressure chamber to communicate with the resupply passage.

In a preferred manner, the first and second cross-sectional areas have an area ratio at least equal to 6 and for example equal to 10.

The first and second ports may be separated from each other, in which case and if necessary, they are mutually angularly offset through a rotation about the axis of symmetry or, on the contrary, they may be interconnected.

In this last case, the second port has advantageously an elongated shape in a direction parallel to the symmetry axle.

In practice and advantageously, the first and second ports should belong to a first and a second group of ports, respectively, each group of ports comprising evenly distributed ports about the axis of symmetry.

The master cylinder according to this invention is outstandingly well adapted for a use in a braking system comprising a hydraulic pump too.

Other features and advantages of the present invention will be apparent from the following detailed description, by way of example and by no means as a limitation, when taken in conjunction with the accompanying drawings, in which:

FIG. 2 is a partial schematic sectional view of the master cylinder according to FIG. 1, the piston being shown in its rest position and the sealing cup having its initial shape;

FIG. 3 is a partial schematic sectional view of the master cylinder according to FIG. 1, the piston being shown in a return phase to its rest position due to the effect of a pump and the sealing cup that delivers brake liquid in master cylinder in an ABS working, the cups being deformed by the pressure due to the effort of the driver.

FIG. 4 is a partial schematic sectional view of the master cylinder according to a first embodiment of the invention, the piston being shown in its rest position and the sealing cup having its initial shape;

FIG. 5 is a partial schematic sectional view of the master cylinder according to FIG. 4, the piston being shown in a return phase to its rest position due to the effect of a pump and the sealing cup that delivers brake liquid in master cylinder in an ABS working, the cups being deformed by the pressure due to the effort of the driver.

Figure 1:
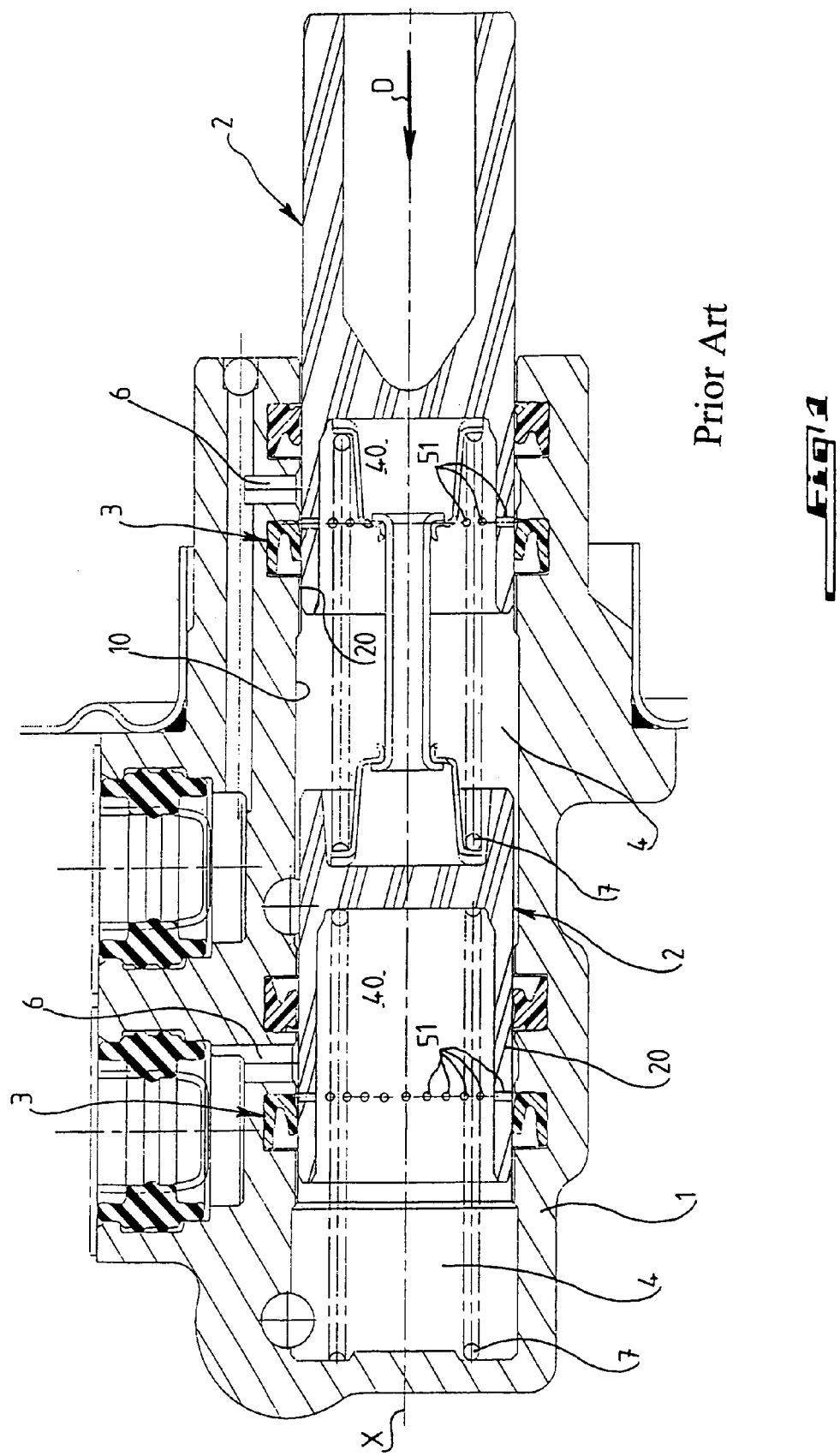
FIG. 1 is a sectional view of a known master cylinder.

FIG. 6 is a partial schematic sectional view of the master cylinder according to a second embodiment of the invention, the piston being shown in its rest position and the sealing cup having its initial shape and FIG. 7 is a partial schematic sectional view of the master cylinder according to FIG. 6, the piston being shown in a return phase to its rest position due to the effect of a pump and the sealing cup that delivers brake liquid in master cylinder in an ABS working, the cups being deformed by the pressure due to the effort of the driver.

FIG. 8 is a diagram showing, using arbitrary co-ordinates, the changes in the pressure P inside the pressure chamber, as a function of the stroke x of the piston, from the rest position of the latter.

As set out hereinbefore, the invention relates to a penetration master cylinder, which mainly comprises a body 1, one or more pistons 2, and one or more sealing cups 3.

Insofar as the arrangement, which is specifically provided for by the invention, is applicable to any piston-cup assembly whatsoever, the special number of pistons used in the master cylinder as described will not be taken into consideration in the following description.

A cylindrical bore 10, extending along an axis of symmetry X, is made inside the body 1.

The piston 2 is fitted for a sliding axial travel inside the bore 10, and it is resiliently biased towards a rest position, as shown in FIG. 1, by means of a compressively prestressed spring 7.

The sealing cup 3 comprises a long bent portion 31, a lip 32 and a bottom portion 33 joining the lip 32 to the long bent portion 31.

The long bent portion 31 is housed inside a groove 11, provided in the bore 10, so as to be translationally rigidly locked with the bore.

The lip 32 is applied in a sealing manner against the cylindrical wall 20 of the piston 2 so as to define a pressure chamber 4 inside the bore 10.

The piston 2 may be moved from its rest position, when an actuating force is exerted in the direction D, and thus reach a position which is shifted in such direction and in which the pressure chamber 4 is subjected to a rising pressure.

The cylindrical wall 20 of the piston forms a cavity 40, which is part of the pressure chamber 4, and is provided with resupply ports 51 distributed in a plane, perpendicular to the axis X, and having a cross-sectional area S1 (not indicated in the drawings), which is relatively large.

In the rest position of the piston 2 (FIG. 1), each port 51 is adjacent to the bottom portion 33 of the cup 3 and disposed in such a way that it causes the pressure chamber 4 to communicate with a resupply passage 6, located inside the body 1 and outside the chamber 4.

This arrangement which is known, besides, from the state of the art, is fully satisfactory as long as the cup 3 does not undergo any undesirable deformation whatever.

As a matter of fact, in this instance and as illustrated in FIG. 3, each port 51 moves away from the bottom portion 33 of the cup 3 to a sufficient extent for an adequate passageway to be opened between the interior and the exterior of the cavity 40, with the result that the pressure chamber 4 may be resupplied with brake fluid under the most favourable conditions.

But, on the other hand, when the piston 2 moves back to its rest position, whereas the chamber 4 in under a pressure delivered by a pump, the lip 32 and the bottom portion 33 of the cup 3 are deformed, as illustrated in FIG. 2, so that the port 51 is partially or fully closed, which means that the resupply of the pressure chamber 4 with brake fluid is no longer sufficient.

In order to cope with this problem, the known solution consists in shifting each port relative to the corresponding pressure chamber, i.e. to shift the part to the right on FIG. 3.

Such a shift involves that the dead stroke of the master cylinder is hugely increased.

The invention aims at solving this problem.

In order to cope with such a problem, and as illustrated in FIG. 4 through 7, the cylindrical wall 20 of the piston 2 exhibits additional resupply ports 52, which are also distributed e.g. in a plane, perpendicular to the axis X, and the cross-sectional area S2 (not indicated in the drawings) of which is comparatively small, as compared with the cross-sectional area S1 of the main resupply ports 51, said former ports causing the pressure chamber 4 to communicate with the resupply passage 6 as well, in the rest position of the piston 2, and the additional ports 52 are located farther away from the lip 32 of the cup 3 than the main ports 51.

The expression "resupply port", used the description in a generic manner to point out the ports 51 and 52 must not be understood as describing in a generic and restrictive manner the function of these ports, since on the contrary, the additional ports 52 of the invention are designed for a quite different goal.

This expression means that the additional ports 52 cause to communicate, like the ports 51 in normal conditions, the master cylinder and the brake liquid reservoir, and the the additional ports 52 help to resupply the master cylinder with brake liquid.

Typically, the cross-sectional area S2 of each additional port 52 is at most equal to a sixth of the cross-sectional area S1 of each main port 51 and, e.g., equal to a tenth of such area S1.

FIGS. 4 and 5 show that the additional ports 52 may be separated from the main ports 51, in which case and in a preferred manner, they are angularly offset relative to the main ports 51, through a rotation about the axis of symmetry X.

Nevertheless, as a variant, the additional ports 52 may also communicate with the main ports 51, as illustrated in FIG. 6 and 7.

Though it is quite possible to provide for one additional port 52 only in the piston 2, the advantages derived from the present invention will be all the more obvious if the main ports 51 and the additional ports 52 actually constitute two sets or groups 510 and 520 of ports, each set or group consisting of ports which are evenly distributed about the axis of symmetry X.

The operating characteristics of the master cylinder according to the invention, more particularly applicable to braking systems comprising a hydraulic pump, besides such master cylinder, are shown in FIG. 8.

The curve C0 in FIG. 8 explains the change in the pressure P inside the pressure chamber 4 when the piston 2 is moved on a stroke "x" from its rest position, at an infinitely slow speed.

The curve C2 shows the change in the pressure P inside the pressure chamber 4 when the piston 2 is moved on a stroke "x" from its rest position, at a comparatively high speed.

And the curve C1 represents the change in the pressure P inside the pressure chamber 4 when the piston 2 is moved on a stroke "x" from its rest position, at a mean speed.

When the piston 2 is moved at an infinitely slow speed (curve C0), the pressure chamber 4 is in permanent equilibrium with the resupply passage 6, as long as the additional ports 52 are not fully closed by the lip 32 of the cup 3, which only happens when the piston 2 has a comparatively long stroke x2.

Therefore, the pressure P prevailing inside the chamber 4 does not increase unless the stroke of the piston 2 exceeds the value x2.

When the piston 2 is actuated swiftly (curve C2), at first the pressure P inside the pressure chamber 4 undergoes a change which, though not negligible, is relatively slow until the main ports 51 are closed by the cup 3, owing to the fact that the cross-sectional area S1 of these ports is great enough for the brake fluid to flow quickly between the pressure chamber 4 and the resupply passage 6.

But, as soon as the main ports 51 are closed by the cup 3, which occurs for a stroke x1 of the piston (curve C2), the pressure P inside the pressure chamber 4 changes swiftly, because the cross-sectional area S2 of the additional ports 52 does not afford a sufficient brake-fluid flow for the pressure P inside the chamber 4 to come into equilibrium with that prevailing within the resupply passage 6.

The curve C1, which corresponds to a state intermediate the states shown by the curves C0 and C2, is located between the latter two curves.

Therefore, the additional ports 52, as provided by this invention, make it possible to achieve an adequate resupply of the pressure chamber 4 while reducing, to the value x1, the dead stroke which the master cylinder has under dynamic flow conditions (curves C1 and C2, taken between x1 and x2), with the result that the changes in the pressure P inside the chamber 4 are all the faster as the piston 2 is actuated swiftly and, consequently, especially quite satisfactory in an emergency braking situation.

The invention claimed is:

1. Penetration master cylinder, comprising at least a body (1) in which a cylindrical bore (10) is provided along an axis of symmetry (X), a piston (2) fitted for a sliding axial travel inside the bore (10), at least between a rest position and a pressure-rise position, and a sealing cup (3) having a long bent portion (31), stationarily housed inside a groove (11) provided in the bore (10), a lip (32) applied against a cylindrical wall (20) of the piston (2), in a sealing manner, so as to define a pressure chamber (4) inside the bore (10), and a bottom portion (33) joining the long bent portion (31) to the lip (32), wherein the cylindrical wall (20) of the piston provides a cavity (40), intended for the pressure chamber (4), and exhibits at least a first resupply port (51) having a determined first cross-sectional area and disposed adjacent to the bottom portion (33) of the cup (3) in the rest position of the piston (2), a position in which said first port (51) causes the pressure chamber (4) to communicate with a resupply passage (6), which is located inside the body (1) and outside the chamber (4), characterised in that it comprises at least a second port (52) having a smaller cross-sectional area than that of the first port, and in that the first and second ports (51, 52) are comparatively nearer and farther from the lip (32) of the cup (3), respectively, in the rest position of the piston (2), in which the second port (52) causes the pressure chamber (4) to communicate with the resupply passage (6).

2. Master cylinder according to claim 1, characterised in that the first and second cross-sectional areas have an area ratio between 6 and 10.

3. Master cylinder according to claim 1, characterised in that the first and second ports (51, 52) are separated from each other.

4. Master cylinder according to claim 1, characterised in that the first and second ports (51, 52) are mutually angularly offset through a rotation about the axis of symmetry (X).

5. Master cylinder according to claim 1, characterised in that the first and second ports (51, 52) are interconnected.

6. Master cylinder according to claim 5, characterised in that the second ports (52) has an elongated shape extended in a direction parallel to the symmetry axle (X).

7. Master cylinder according to claim 1, characterised in that the first and second ports (51, 52) belong to a first and a second group (510, 520) of ports, respectively, each group of ports comprising evenly distributed ports (51, 52) about the axis of symmetry.

* * * * *